US006428887B1

(12) United States Patent
Vargo et al.

(10) Patent No.: US 6,428,887 B1
(45) Date of Patent: Aug. 6, 2002

(54) ADHESIVE OXYHALOPOLYMER COMPOSITES

(75) Inventors: Terrence G. Vargo, Kenmore; Douglas J. Naab, Churchville; Timothy S. Koloski, W. Amherst, all of NY (US)

(73) Assignee: Integument Technologies, Inc., Tonawanda, NY (US)

( * ) Notice: Subject to any disclaimer, the term of this patent is extended or adjusted under 35 U.S.C. 154(b) by 0 days.

(21) Appl. No.: 09/239,108

(22) Filed: Jan. 27, 1999

Related U.S. Application Data

(60) Provisional application No. 60/073,114, filed on Jan. 30, 1998.

(51) Int. Cl.$^7$ ................................................. B32B 15/08
(52) U.S. Cl. .................. 428/343; 428/411.14; 428/421; 428/416; 156/302
(58) Field of Search ........................... 428/411.14, 421, 428/416, 343; 156/302

(56) References Cited

U.S. PATENT DOCUMENTS

| | | | |
|---|---|---|---|
| 3,030,290 A | 4/1962 | Ryan, Jr. et al. | 204/169 |
| 4,919,659 A | 4/1990 | Horbett et al. | 623/1 |
| 4,933,060 A | 6/1990 | Prohaska et al. | 204/192.36 |
| 4,946,903 A | 8/1990 | Gardella, Jr. et al. | 525/326.4 |
| 5,051,312 A | 9/1991 | Allmer | 428/458 |
| 5,055,316 A | 10/1991 | Hoffman et al. | 427/2 |
| 5,246,451 A | 9/1993 | Trescony et al. | 623/1 |
| 5,449,383 A | 9/1995 | Chatelier et al. | 623/1 |
| 5,627,079 A | 5/1997 | Gardella, Jr. et al. | 436/525 |

FOREIGN PATENT DOCUMENTS

GB 998807 7/1965

*Primary Examiner*—Necholus Ogden
(74) *Attorney, Agent, or Firm*—Howard M. Ellis

(57) ABSTRACT

There is disclosed adhesive-oxyhalopolymer composites having surface hydrogen and oxygen or oxygen functionality groups wherein the oxygen or oxygen functionality sites are chemically bonded to an adhesive material forming a stable and permanent bond with surprisingly and unexpected superior bond strength. The adhesive-oxyhalopolymer composites comprise an oxyhalopolymer prepared from a halopolymer having from about 1 to 100 percent of surface halogens permanently substituted with hydrogen and oxygen or oxygen-containing groups of which from about 3 to about 30 percent of the substituted halogens are replaced with oxygen or oxygen-containing groups and from about 70 to about 97 percent of the substituted halogens are replaced with hydrogen atoms and the oxyhalopolymer is chemically bonded to an adhesive material.

26 Claims, No Drawings

US 6,428,887 B1

ADHESIVE OXYHALOPOLYMER COMPOSITES

CROSS REFERENCE TO RELATED APPLICATION

This application claims the benefit of U.S. Provisional Application Ser. No. 60/073,114 filed Jan. 30, 1998.

TECHNICAL FIELD

The present invention relates generally to halopolymer materials with adhesive surfaces, and more specifically, to adhesive-oxyhalopolymer composites having surface hydrogen and oxygen or oxygen functionality groups wherein the oxygen or oxygen functionality sites are chemically bonded to an adhesive material forming a permanent bond.

BACKGROUND OF THE INVENTION

Halopolymers are a group of polymers that consist of carbon chains wherein all or a percentage of the carbons have covalent bonds to halogens atoms. Halopolymers are characterized by extreme inertness, high thermal stability, hydrophobicity, low dielectric properties, and low coefficients of friction. Representative examples of halopolymers that exhibit these characteristics include fluoropolymers and fluorochloropolymers, such as fluorohydrocarbon polymers, e.g., polyvinylidene fluoride (PVDF), polyvinyl fluoride (PVF), polychlorotrifluoroethylene (PCTFE), including the well known fluorocarbon polymers, e.g., perfluorinated polymers, like polytetrafluoroethylene (PTFE), and expanded polytetrafluoroethylene (ePTFE). However, because halopolymers are so inert and have low coefficients of friction, they will not reliably bond to other surfaces, or bond to value-added molecules. As such, the sought after characteristics of a halopolymer, such as inertness and hydrophobicity are not easily transferred to another substrate because of the difficulty in adhering a halopolymer film to the substrate.

Several attempts have been made to modify halopolymers to provide more bondable surfaces. For instance, U.S. Pat. No. 4,933,060 discloses a reactive gas plasma process wherein a glow discharge in an oxygen containing atmosphere leads to the formation of oxygen containing functionalities on the surface. However, this method merely etches the surface creating transient oxygen containing functionality and the activity of the bonding sites is short-lived thereby rendering an etched material with a limited shelf-life. Furthermore, the polymeric chains containing the oxidized surface functionalities undergo unavoidable reorientation due to their low molecular weight and subsequent migration, as described by H. Yasuda et. al. in *J. Polym. Sci.: Polym. Phys. Ed.*, 19, 1285 (1981). As a result, the surface of an etched halopolymer has limited time of reactivity, and therefore, must be applied to an adhesive before reorientation of the etched surface. Moreover, a bond formed between the adhesive and etched halopolymer material is not permanent and tends to degrade under UV radiation, humidity and thermal stress conditions due to rearrangement of the polymer.

British Patent Specification No. 998,807 provides for a method of increasing adhesiveness of a halopolymer using corona discharge plasma in an inert atmosphere which is essentially oxygen-free. However, the processed material must be maintained in an oxygen-free atmosphere to maintain activity. Once the surface is exposed to moisture or oxygen the treated surface is deactivated thereby limiting useful shelf-life. Furthermore, corona discharge plasmas are non-uniform plasmas generated from a point source so the processed material is not uniformly modified or activated. Thus understood, the non-uniformity of the surface prevents any continuity in batch production of the modified film.

Another method of modifying a halopolymer material to increase adhesiveness includes etching the halopolymer material by reacting the material with alkali metal and naphthalene. However, this method provides a low level of defluorination and the material degrades easily under thermal and ultraviolet stress conditions. Furthermore, the surface is chemically roughened (i.e., etched) which, in addition to an inconsistent degree of modification, provides nothing more than a non-permanent mechanical bond.

Accordingly, it would be highly desirable to have a halopolymer material possessing all the desired properties of inertness, stability, hydrophobicity, but which can chemically bond to an adhesive to form a permanent and stable bond.

SUMMARY OF THE INVENTION

It is a principal object of the present invention to provide a surface modified halopolymer which repels water and other polar solvents, has high thermal stability, has a low friction coefficient and chemically bonds to an adhesive substance forming a permanent bond having surprisingly and unexpected superior bond strength.

It is another object of this invention to provide an adhesive-oxyhalopolymer composite comprising a modified halopolymer material having substituted functional groups that chemically bond to an adhesive material forming a bond that does not degrade due to chemical attack, ultraviolet radiation, humidity, temperature extremes, salt, acid or caustic agents, steam and/or reorientation of substituted functional bonding sites.

Yet another object is to provide an adhesive-oxyhalopolymer composite that can withstand attack by chemicals, ultraviolet radiation, humidity, temperature extremes, salt, acid or caustic agents and steam.

A further object of the present invention is to provide a surface modified halopolymer film having two sides of which the first side is chemically bonded to an adhesive whereby during the wrapping or overlapping of the film the adhesive coated first side will bond to the second side.

A still further object is to provide an adhesive-oxyhalopolymer composite wherein the oxyhalopolymer is uniformly treated and reproducible thereby providing quality control in the adhesive end product.

Yet another object is to provide methods for preparing an adhesive-oxyhalopolymer composite having a modified surface which is not roughened or damaged by plasma etching, but instead controllably modified by the incorporation of hydrogen and oxygen functionality groups onto the surface matrix of the oxyhalopolymer thereby imparting permanent chemical reactivity to the surface.

In this regard, it has been discovered that when the surface of a halopolymer material is exposed to radio frequency glow discharge (RFGD) in the presence of a hydrogen gas-vapor mixture comprising water, methanol, or other oxygen containing liquids (i.e., formaldehyde), a modified surface forms which comprises a controllably reduced amount of the original halogens which are replaced with controlled amounts of hydrogen and oxygen or oxygen-containing groups covalently bonded to the carbon backbone of the polymer. The surface modified halopolymer material, which is an oxyhalopolymer, retains the unique properties of the original halogenated material. In addition, the surface modified halopolymer or oxyhalopolymer is quite reactive and chemically bonds with an adhesive substance forming a stable and permanent bond with surprisingly and unexpected superior bond strength.

The oxyhalopolymer material may be in the form of a film, sheet, powder, bead, fiber, mesh, mold, coating, tubing, porous veiled material or any other shape utilized for a specific application. When the oxyhalopolymer material is chemically bonded to an adhesive the resulting adhesive-oxyhalopolymer composite of the present invention may be applied to almost any surface including metal, non-metal, wood, ceramic, glass and plastic thereby imparting the desirable properties of a halopolymeric material to the new surface. These adhesive-oxyhalopolymer composites are useful for innumerable household and industrial applications an can be applied to a substrate in situ, to preserve, protect and extend the life of the object. Such objects may include the bases of telephone poles, fence posts, concrete foundations, drain gutters, airplane wings to reduce ice formation, hulls of ships and docks to prevent marine biofouling, fume hoods, machine tools, walls of buildings as anti-graffiti coatings, bondable gaskets, chemical containment vessels and pipes for protecting the containment structure, coil coatings, metals, such as carbon steel or any other surfaces which may be damaged or corroded by exposure to humidity, mildew, temperature, salt, corrosive chemicals, weather or ultraviolet (UV) radiation.

In forming the adhesive-oxyhalopolymer composites an outer surface of a halopolymer is modified by substituting hydrogen and oxygen or oxygen-containing groups for at least a portion of the halogens atoms on the halopolymer surface. Subsequently, the oxygen or oxygen-containing groups on the surface of the modified oxyhalopolymer-containing substrate are chemically bonded to an adhesive to form the composites of the present invention. The bulk characteristics, such as chemical resistance, inertness, stability of polymeric structure and hydrophobicity of the original starting halopolymer material are retained below the outer surface of the modified oxyhalopolymer.

The adhesives which may be applied to the oxyhalopolymers to form the composites of this invention may be selected from the group consisting of cyanoacrylate, epoxy, silicone, acrylic, rubber, polyurethane, unsaturated polyester, contact, pressure sensitive, thermoplastic, fluorine based and mixtures thereof.

The morphological properties of the oxyhalopolymer, at the molecular level, remain substantially unchanged from those of the starting halopolymer while wettability with respect to low surface tension liquids and surface free energy ($\gamma_s$) as determined through critical surface tension ($\gamma_c$) are increased. Instead of applying a modified polymer coating (i.e., a new film layer) to the surface of an original halopolymer material, the object is to provide for an oxyhalopolymer material in which the original starting bulk halopolymer is permanently modified at the molecular level by removal of some of the halogen atoms, so the carbon backbone has halogen, oxygen and hydrogen atoms covalently bonded thereto. In essence, the original halopolymer which is modified to form an oxyhalopolymer has a sufficient number of halogen atoms permanently substituted with both hydrogen atoms and oxygen functionality covalently bonded to the carbon backbone to a surface depth of about 10 to about 100 Å to increase the surface free energy ($\gamma_s$) while the hydrophobic properties are substantially unchanged and non-fouling properties are maintained.

Another embodiment of the present invention is to provide for adhesive-oxyhalopolymer composites which comprise a halopolymer material, such as a film having a first and second side with at least the first side's outer surface modified by substituting hydrogen and oxygen or oxygen-containing groups for at least a portion of the halogen atoms thereby providing an oxyhalopolymer film. The oxygen or oxygen-containing groups substituted on at least the first side of the oxyhalopolymer film are chemically bonded to an adhesive to form a composite structure. If only one side of the halopolymer film is modified, the surface of the modified side will bond to an adhesive while the other side will retain the surface properties of the original halopolymer film. If both sides of the halopolymer film are modified and only one side of the modified film is bonded to an adhesive, the other modified side retains its chemical reactivity almost indefinitely with little or no reorientation of the surface functionality groups. This allows for extended shelf-life of the adhesive-oxyhalopolymer composites of the present invention. It also allows for a stable film which may be used sometime in the future when the film is wrapped or layered upon itself for protecting a surface because the modified side without the adhesive is still very reactive, and therefore, can from covalent bonds with the adhesive coated side as soon as contacted therewith. If both sides of the halopolymer are modified and subsequently bonded to an adhesive then the double-sided adhesive oxyhalopolymer film may be "sandwiched" between two other materials. This application forms an internal protective barrier by imparting the halopolymer characteristics between two materials, such as between layers of wood panels for laminating wood composites, between underlayment and floor tiles, plywood roof sheeting and asphalt tile or providing a bonding surface between two incompatible materials. Additionally, an adhesive-oxyhalopolymer composite of the present invention may bond to itself thereby allowing for overlap of an adhesive-oxyhalopolymer film on to itself during application to a surface. This provides for better sealing with virtually no degradation of the adhesive seal on the overlapping edges of the film.

In the adhesive-oxyhalopolymer composites of the present invention up to 98 percent, and more specifically, from about 20 to about 85 percent of the surface halogen atoms of the oxyhalopolymer material are permanently substituted with hydrogen and oxygen and/or oxygen-containing groups of which from about 3 to about 30 percent of the substituted halogen atoms are replaced with oxygen and/or oxygen-containing groups and from about 70 to about 97 percent of the substituted halogen atoms are replaced with hydrogen atoms. The exact amount of hydrogen, halogen and oxygen or oxygen containing functional groups depends on several variables, such as the type of polymer, the thickness of same and resident time of exposure to the plasma gas/vapor mixtures used in the present invention. It has been discovered that there is an optimal time of exposure to the plasma gas/vapor mixtures for each type of polymer to provide the optimal level of controlled modification of the surface of the polymer. It has been additionally discovered that there appears to be a differing degree of maximum bonding depending on the specific polymeric type, (i.e., mechanical properties and inherent polymer characteristics).

The halogens are replaced to depths from about 10 to about 200 Å, and preferably from about 10 to 100 Å. However, the morphological properties and bulk properties of the oxyhalogenated surface remains substantially unchanged over the starting bulk halopolymer material.

Another embodiment of the present invention provides for adhesive-oxyhalopolymer composites comprising a halopolymer material, such as a film having both a first and second side which is modified by substituting hydrogen and oxygen and/or oxygen-containing groups for at least a portion of the halogen atoms thereon to provide an oxyhalopolymer film. The reactive oxygen or oxygen-containing sites on the first side of the oxyhalopolymer film are chemically bonded to an adhesive substance, and the oxygen or oxygen-containing sites on the second side of the oxyhalopolymer film are covalently bonded to a transition metal. Generally, transition metals for this invention are intended to include metals from Groups IIIa, IVa, Va, VIa, VIIa, VIIIa, Ib, IIb, IIIb and IVb of the periodic table. The adhesive-oxyhalopolymer composites having covalently bonded transition metals provide surfaces with catalytic activity. They may be utilized as biocidal coatings, shielding coating, absorbing coatings to absorb sound or radiation, and as a surface barrier which may block the transfer of gas and water vapor. Further, they may be securely attached to other substrates by applying the adhesive side of the modified oxyhalopolymer to the substrate.

Additionally, because some specialized adhesives form stronger bonds when applied to surfaces with metallic characteristics, the metallic characteristics of the second side of the adhesive oxyhalopolymer film may be used as a surface for chemically bonding an adhesive.

It is yet a further object of the present invention to provide for a method of making the previously described adhesive-oxyhalopolymer composites, the method which comprises providing a halopolymer material wherein at least a portion of halogen atoms are substituted with hydrogen and oxygen or oxygen-containing thereby forming an oxyhalopolymer material and contacting the oxyhalopolymer material with an adhesive. Specifically, adhesive-oxyhalopolymers composites of the present invention may be prepared by the following steps of:

a) providing a halopolymer material;
b) modifying at least one surface of the halopolymer material of step (a) by treating the surface with a radio frequency glow discharge gas/vapor mixture under vacuum to substitute at least a portion of the halogen atoms with hydrogen and oxygen or oxygen-containing groups at the molecular level to provide at least one oxyhalopolymer surface; and
c) contacting the oxyhalopolymer surface of step (b) with an adhesive.

Any adhesive may be used that bonds to the surface functionality groups of the modified halopolymer including but not limited to epoxy, fluorine based, aqueous based, solvent based, acrylic, polyester, heat sealable, pressure sensitive including rubber, acrylic and/or silicone, release coating and mixtures thereof. The gas/vapor mixtures may be selected from hydrogen, water, methanol or other oxygen containing liquids (i.e., formaldehyde), and preferably a hydrogen/methanol or hydrogen/water mixture.

The method imparts reactive sites that chemically bond to an adhesive. Plasma gas/vapor mixture concentrations of hydrogen, water, methanol, and other oxygen contain liquids, such as formaldehyde together with wattage or power of the glow discharge and time of plasma treatment are variables which determine the depth of surface modifications, as well as the respective atomic concentrations of carbon, halogen, hydrogen and oxygen making up the oxyhalopolymer surface.

The invention further contemplates adhesive-oxyhalopolymer composites in which the original halopolymer material has from about 1 to about 100 percent of the surface halogen atoms to depths from about 10 to about 100 Å permanently substituted with hydrogen and oxygen or oxygen-containing groups of which from about 3 to about 100 percent of the oxygen or oxygen-containing groups are chemically bonded to an adhesive.

A further principal embodiment of the present invention provides for adhesive-oxyhalopolymer composites that are prepared from non-halogenated substrates, such as fibers, films and sheets, consisting of polymeric materials(non-halogenated), e.g., thermosetting and thermoplastic resins and plastics; ceramic materials; and/or metallic materials. The surface of the non-halogenated substrate is modified either by halogenation processes through bonding of halogen atoms to the polymer backbone, or by coating a halocarbon film thereto. The halogenated and halocarbon coated surfaces of the non-halogenated substrates are subsequently oxyhalogenated to provide reactive sites for chemically bonding with an adhesive to form the adhesive-oxyhalopolymers composites of the present invention.

DESCRIPTION OF THE PREFERRED EMBODIMENTS

For purposes of this invention, the terms and expressions below, appearing in the specification and claims, are intended to have the following meanings:

"Permanent" as used herein mean substantially unchanged over an extended period of time.

"Halogenated polymers", "halopolymer" and variations thereof as used herein means polymeric materials containing highly electro-negative atoms referred to in the elemental periodic table as halogens, i.e.,fluorine, chlorine, bromine, and iodine.

The halogenated polymers preferred as starting materials for the adhesive-oxyhalopolymer composites of this invention are those comprised of a carbon backbone, with practically any combination of fluorine, chlorine, hydrogen, and oxygen atoms bonded thereto. This includes polymeric carbon backbones containing one or any combination of two, three or four atoms out of the group of fluorine, chlorine, hydrogen and oxygen. For example, fluoro- and fluorochloropolymers, such as fluorohydrocarbon polymers like polyvinylidene fluoride (PVDF), polyvinyl fluoride (PVF),poly (vinyl difluoride), piezo and pyroelectic poled PVDF, polychlorotrifluoroethylene (PCTFE), polytetrafluoroethylene (PTFE), ethylenechlorotrifluoroethylene (ECTFE), fluorinated ethylene propylene copolymer (FEP), expanded polytetrafluoroethylene (ePTFE), and polyvinyl chloride (PVC), although not totally inclusive, are all illustrative of starting halogenated polymers having carbon and fluorine atomic compositions, as well as polymers having carbon and chlorine; carbon, fluorine and chlorine; and carbon, fluorine and hydrogen. That is, they are generically known as halocarbons and halohydrocarbon polymers.

Other halogenated polymers serving as useful starting materials include the various perfluorinated and fluorinated siloxanes, copolymers comprised of tetrafluoro-ethylene block segments with other non-halogenated polymeric blocks e.g., polytetrafluoroethylene-ether-urethane (PFEU), polyfluoroalkoxy polymers or copolymers comprising tetrafluoro-ethylene and perfluoro-2-2-dimethyl-1,3-dioxole e.g., Teflon-AF® (a Dupont trademark), perfluoroalkoxy-substituted fluoropolymers (PFA), such as MFA (available from Ausimont USA, Thoroughfare, N.J. Jersey, sold under the trademark HYFLON® and obtained by the copolymerization of tetrafluoroethylene and perfluoromethylvinylether), perfluorinated polystyrenes and copolymers containing fluorinated styrene segments, fluorinated phosphazines, as well as the myriad of other polymeric materials containing halogenated functionality which can be segregated and exposed at the surface of the material creating a highly electronegative environment.

In some applications the base material may not be a halogenated material, and therefore must be halogenated before further treatment with the methods of the present invention. Non-halogenated polymers, such as the polyolefins, for example, can have their surfaces halogenated by either gas-phase surface halogenation processes or coated with a halocarbon based plasma film. Both processes are well known and documented in the prior art. Typically, gas phase halogenation polymers are exposed to a mixture of the halogen and nitrogen whereby halogen atoms become bonded to the polymer surface at the molecular level. Lagow and Margrave, *Progr. Inorganic Chem.*, Ed. S. J. Lippard, 26 (1979) 161 disclose methods of gas phase surface fluorination for imparting anti-reflective, low surface energy to various commercially available base polymers, such as highly cross-linked polyethylene, polypropylene, poly (methyl methacrylate), polycarbonate, polyester, polystyrene and polymethylpentene. D. T. Clark et al, *Jour. Polym. Sci.*, Polymer Chem. Ed., Vol. 13, 857–890 (1975) also disclose the surface fluorination of high density polyethylene films. The contents of both publications are incorporated herein by reference. Other representative enabling publications relating to gas phase fluorination methods include U.S. Pat. Nos. 3,988,491 and 4,020,223 which are also incorporated by reference herein.

Methods for preparing fluorocarbon plasma deposited films are also well documented in the literature. For instance, Haque and Ratner, *Jour. App. Polym. Sci.*, Vol. 32, 4369–4381 (1986) disclose suitable methods for modification of polymer surfaces with plasma deposited thin films using a capacitatively coupled RF-discharge system. Representative useful fluorinated gaseous materials include hexafluoroethylene, perfluoropropane and hexafluoropropene. K. Nakajima et al, *Jour. App. Polym. Sci.*, Vol. 23, 2627–2637 (1979) disclose methods for applying plasma polymerized fluorocarbon coatings which can be utilized for generating surfaces having low dielectric and non-corrosive properties. U.S. Pat. No. 4,718,907 to Karwoski et al discloses useful methods for introducing fluorinated coatings for vascular grafts and other biomedical technologies. The foregoing publications relating to methods for applying plasma deposited fluorocarbon coatings are incorporated-by-reference herein.

Representative non-fluorinated thermosetting materials that may be halogenated for further treatment include the phenolic, aminoplast and epoxy type resins, to name but a few. Thermoplastic materials include a broader range of resinous materials including, but not limited to the polyolefins, like polyethylene, polypropylene; acrylic resins which include esters of acrylic or methacrylic acids, sometimes modified with non-acrylic monomers.

Other useful non-halogenated base materials or substrates include ceramic materials and metallic materials, such as gold, nickel, copper, aluminum, non-ferrous alloys and ferrous alloys, such as steel, i.e., low and high carbon steel alloys, stainless steels, such as SS316L and SS304L. Representative non-ferrous alloys include the nickel based alloys available under well known trademarks Monel®, Hastelloy® and Inconel®.

Ceramic substrates may include classes of non-halogenated materials such as alumina, corderite, fosterite, porcelain (zircon), steatite, titanates (Ba, Sr, Ca, Mg and Pb), titanium dioxide, vitreous silica, borosilicates, quartz, and zinc crown glasses, to name but a few. Included within the ceramic substrates are the conductive, semi-conductive and dielectric materials, which are materials based on either oxides, carbides, nitrides and borides. Representative examples of non-halogenated conductive ceramics substrates contemplated are titanium nitride and titanium boride; semi-conductive ceramics include such representative examples as metal suicides like titanium silicide, tantalum silicide and tungsten silicide, and metal oxides like tin oxide, zinc oxide and copper oxide. Non-conductive ceramic materials include substrates containing glasses from the class of silicon oxides ($SiO_2$).

Regardless of whether the starting material is that of a bulk halopolymer or a non-halogenated material which has been surface halogenated or treated with a deposited halopolymeric film, it is necessary to permanently oxyhalogenate the halogenated material. In general, the incorporation or synthesis of oxygen sites on the surface of a halogenated polymer material need only be of such concentration that the oxygen functionality and resulting backbone of the polymer be stable. Generally, from about 1 to 100% of the original halogens of the halopolymer are substituted with hydrogen and oxygen or oxygen-containing groups, and preferably ranging from about 3 to about 70%. The oxygen functionality may take the form of oxo, hydroxyl, alkoxy, inclusive of methoxy, ethoxy and propoxy or R'—CO— or combinations thereof, where R' is hydrogen or alkyl, and particularly C1 to C5 lower alkyl, including methyl, ethyl, propyl, isopropyl, and so on. In addition, the oxygen functionality may also take the form of $PO_y$ or $SiO_y$, wherein y is 2–3.

The present invention contemplates virtually any suitable technique that modifies, without etching, the surface of halopolymer materials through the introduction of hydrogen and oxygen or oxygen-containing sites wherein the modified surface forms permanent bonds with an adhesive material without changing the morphological and hydrophobic properties of the original halopolymer.

A representative example of means for preparing oxyhalopolymers with the desired substituted hydrogen and oxygen or oxygen functionality groups is disclosed by J. A. Gardella, Jr. and T. G. Vargo in U.S. Pat. Nos. 4,946,903 and 5,266,309, the disclosures of which are incorporated herein by reference. According to Gardella and Vargo, hydrogen and oxygen or oxygen functionality groups can be incorporated into halogenated polymers and resins by exposing them to a radio frequency glow discharge (RFGD) plasma comprised of a gas/vapor mixture, such as a hydrogen/water or hydrogen/methanol mixture. By using RFGD a variety of species generated from the gas/vapor plasma mixture become chemically active and covalently bond to the carbon backbone of the halopolymer. As a result, surface halogens bonded to the carbon backbone are replaced with hydrogen and oxygen or oxygen-containing groups but the morphological and hydrophobic properties of the resulting oxyhalopolymers remain substantially unchanged from the original halopolymer material. Using this procedure it has been shown that hydroxyl functionality can be permanently formed onto fluoropolymeric surfaces, such as FEP, PTFE, ePTFE, MFA, PFA, ECTFE, PCTFE and PVDF. Accordingly, the RFGD methods of Gardella and Vargo provide a useful means for producing surfaces having oxygen functionality which can be subsequently chemically bonded to an adhesive substance. In addition, this allows for a wide range of film/adhesive combinations to be prepared depending on the intended application.

As previously indicated, in preparing the adhesive-oxyhalopolymer composites, useful starting materials include the halopolymeric materials cited above which are treated such that incorporation of reactive oxygen functionality onto the molecular structure of the halogenated polymer is readily accomplished. The objective is to introduce hydrogen and either oxygen or oxygen-containing groups onto the halopolymeric material and thereby displace some of the halogen atoms to form a stable material. This does not include the introduction of oxygen atoms into the polymer backbone per se, but only in substituting existing halogen atoms. As stated earlier, the oxygen functionality may be varied and include such representative examples as hydroxyl (—OH), ether (C—O—C), epoxide (—O—), aldehyde (—HC=O), ester (O=C—O—) or carboxylic acid (—COOH) in addition to those mentioned above. These oxygen functionalities have the desired electronic characteristics and chemical reactivity required according to this invention. Specifically, these oxygen functionalities when incorporated onto the carbon backbone of a polymer which also contains electronegative atoms, such as fluorine or chlorine (or functional groups containing these atoms) have properties similar to Bronstead acids (e.g. in the cases of hydroxyl and the carboxylic acid functionality) or, Lewis bases which are able to donate lone pairs of electrons in the cases of the epoxide, aldehyde, ester and ether functionalities.

Upon completion of substituting surface halogen atoms with hydrogen and oxygen or oxygen functionality groups the oxyhalogenated material is contacted with an adhesive either immediately or some time in the future because timing does not affect the performance of the product. Any adhesive that bonds to an oxygen or oxygen functionality reactive site may be used in the present invention including either natural or synthetic types. Natural adhesives may include different types; such as animal, vegetable and mineral, such as shellac, gum arabic resins, carnauba wax, linseed oils, mineral waxes, amber resins to name a few. Synthetic adhesives may include elastomers, thermoplastic and thermosetting types, such as synthetic rubber, cellulose derivatives, vinyl polymers, polyesters, polyacrylates, polyethers, polysulfones, amino plastics, epoxides, phenolic resins, polyaromatics and furanes.

Generally, thermoplastic adhesives are a class based upon long-chained polymeric structure, and are capable of being softened by the application of heat. Thermosetting adhesives are a class of adhesives based upon cross-linked polymeric structure, and are incapable of being softened once solidified. Both thermoplastic and thermosetting adhesives are cured (set, polymerized, solidified) by heat, catalysts, chemical reaction, free-radical activity, radiation, loss of solvent, etc., as governed by the particular adhesive's chemical nature. Elastomers are a special class of thermoplastic adhesives possessing the common quality of substantial flexibility or elasticity. Pressure-sensitive adhesives are permanently tacky solids and form bonds when pressure is applied. They are available as films, tapes and hot-melt solids.

The above named adhesives represents only a sample of the many different types that can be chemically bonded to the reactive sites on oxyhalogenated polymer substrates. The method of application of the adhesive is dependent upon the particular end use and the adhesive. For example, adhesives can be brushed, sprayed, dipped, nip rolled, reverse rolled, gravure coated, UV coated or by any practical method. The adhesive may be applied directly to an oxyhalopolymer material, such as a film or to another substrate that in turn will be covered or contacted with the oxyhalopolymer film. Preferably, pressure sensitive adhesive is directly laminated onto the surface of the oxyhalopolymer film by nip rolling under an optimum load pressure which is dependent upon the specific adhesive and is well known to those skilled in the art.

Each individual adhesive will predetermine the application parameters and final properties of the adhesive surface, e.g., surface preparation, cure time, external surface(either rough or smooth), prevention or reduction of galvanic, atmospheric and chemical corrosion, insulating properties, vibration dampening, distribution of stresses, service-temperature limitation, service deterioration, fatigue properties, storage life or assembly toxicity. An extensive list of properties and application methods can be found in J. Shields, "Adhesives Handbook." CRC Press(Division of The Chemical Rubber Co.), 1970, the content of which is incorporated herein by reference.

The amount and thickness of adhesive material that is chemically bonded to the modified halopolymer is dependent upon the properties of the specific adhesive and the anticipated end use of the composites. Generally, from about 1 to about 10 mils of adhesive is applied for chemical bonding to the modified halopolymers.

Using the reactive oxygen functionality sites on the oxyhalopolymeric material, an adhesive can be directly applied to the modified surface, especially in cases where the density of the reactive oxygen functionality is sufficient to allow good interfacial wetting of the adhesive. However, in some situations depending on the type of adhesive, such as a water based adhesive, the reactive oxygen functionality sites may initially be bonded to a crosslinking agent, such as an organosilane coupling agent thereby increasing surface wettability of the oxyhalopolymer. In turn, the crosslinking agent may be contacted with an adhesive thereby obtaining a stronger bond between the oxyhalopolymer and adhesive. Organosilane coupling agents are available in a variety of formulations such that they possess a variety of reactive organic ligands, such as amines, epoxides, vinyls, thiols among many others. These organic ligands are subsequently useful for reacting with adhesives which possess corresponding chemical functionality which are compatible or reactive to the organic ligand presented by the organosilane coupling agent. Representative organosilane coupling agents that are useful in the present invention have the formula:

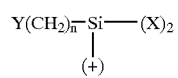

in which Y is a member selected from the group comprising allyl, alkyl, haloalkyl, amino, mercapto, epoxy, glycidoxy, methacrylate, cyano and —CH$_2$CO$_2$alkyl, n is from 0 to 17 and X is independently selected from hydrogen, halogen, alkyl, haloalkyl, alkylamino, alkoxy, trialkylsiloxy, vinyl and epoxy.

As stated earlier, it is envisioned that one embodiment of the invention is a halopolymer film modified on both sides of the film wherein the oxygen or oxygen functionality groups on one side are chemically bonded to an adhesive material and on the opposite side the oxygen or oxygen functionality groups are covalently bonded to a metal, such as a transition metal. A method to metallize oxyfluoropolymers with transition metals has been described by T. Koloski and T. Vargo in U.S. Pat. No. 5,703,173 the disclosure of which is incorporated herein by reference.

Briefly, through various liquid and gas/vapor phase chemical reactions, methods are described which provide for metallized polymers comprising transition metal species covalently bonded directly to modified halogenated polymeric supports, e.g., fluoropolymeric, chlorofluoropolymeric, etc., solid substrates. The transition metals are bonded to the oxyhalopolymer surfaces to provide compositions of matter comprising base halogenated polymers with the metals covalently bonded to surface oxygen functionality to depths of approximately 200 Å. The metallized polymers may hereinafter be referred to as metallohalopolymers or "MHPs". Representative MHPs may include the following structural formulas with repeating non-terminal units selected from the group of:

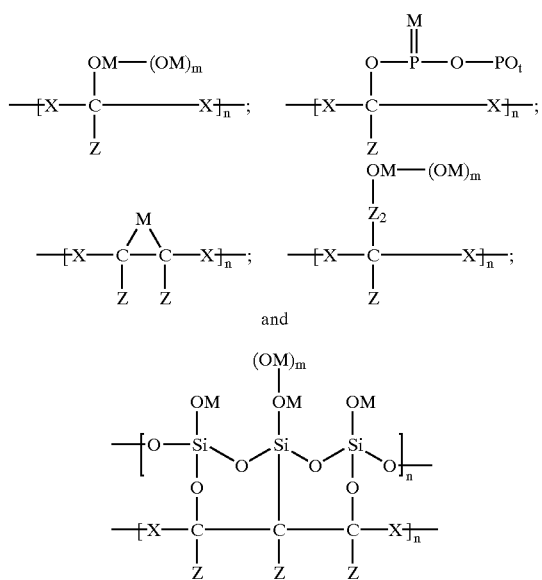

Where M is a transition metal; Z is fluorine, chlorine, hydrogen, $-(CH_2)_y-CH_3$, $-CH_3$ or $O-R$ where R is hydrogen, $-(CH_2)_y-CH_3$ or $-CH_3$ where y is 1 to 20; X is $CF_2$, $CFCl$, $CCl_2$, $CFH$, $CClH$ or $CH_2$ and n=10 to 1000, t=2 to 3 and m=0 to 1000.

Generally, the metallohalopolymer side of a oxyhalopolymer substrates may function as a heterogeneous catalyst, an impermeable surface to prevent transfer of gas and vapors, a sensor probe or as an active biocide, i.e., effective in a biological system by demonstrating fungicidal, bactericidal, and viricidal activity. In this regard, the adhesive-oxyhalopolymer composites of this invention may be used in systems for purification of gases and liquids, such as ventilation units in hospitals or water treatment. Essentially, the side of the oxyhalopolymer film chembically bonded to an adhesive may be adhered to a another surface, such as a walls in a hospital operating room while the opposite metallohalopolymer side functions as a biocidal surface.

Alternatively, transition metals which have been bonded to oxygen functionality sites of a oxyhalopolymer surface may act as a crosslinking agent for further bonding with an adhesive material.

In addition to the above methodologies, a halopolymeric material may be selectively oxyhalogenated through the introduction of reactive oxygen sites using known masking and photolithographic techniques. With a template type system, only the exposed or unmasked portions of the halopolymeric support will be oxyhalogenated. Ultimately, the oxyhalogenated portions may be metallized for a patterned effect or chemically bonded to an adhesive.

While not wishing to be held to any specific mechanism of action, it is nevertheless believed that the type and permanent strength of the chemical bond between the oxygen functionality sites and the adhesive material is dependent upon a number of factors including the density of reactive oxygen functionality sites, the lack of reorientation of the covalent bond formed between the carbon backbone and substituted oxygen functionality groups and the specific adhesive.

The type of chemical bond between the oxyhalopolymer and adhesive may be either covalent or ionic depending on the oxygen functionality and/or adhesive material. For example, the reactive oxygen functionality sites on a oxyhalopolymer material act as strong nucleophiles and can readily attack an adhesive having an electrophilic functionality. Specifically, if an adhesive has an $RC(NH_x)_y$ functionality, the C can react with an oxygen functionality site of the oxyhalopolymer and form a covalent bond between the oxyhalopolymer surface sites and the adhesive. Also, the nature of the oxygen functionality sites on the surface of the halopolymer, such as a —OH functionality, can provide for electrostatic or ionic bonding between an oxyhalopolymer surface and an adhesive that possesses a positive charge. Additionally, the —OH functionality on the oxyhalopolymer can be deprotonated such that the oxyhalopolymer surface will exhibit electronegative functionality which can ionically bond adhesives possessing electropositive character.

The method used to modify the halopolymer effectively cleaves only side atoms or groups which are halogens, such as fluorine or chlorine that are bonded onto the basic carbon backbone of the halopolymer. In turn, the hydrogen and oxygen or oxygen functionality groups which replace the halogens are covalently bonded directly to the carbon backbone of the halopolymer. The surface is not damaged, etched or roughened during the process of modifying the halopolymer, and therefore, the newly bonded functional groups on the modified surface are not rearranged over time or lost from the surface. There is essentially no reorientation of the modified surface and this provides for surface reactivity over extended periods of time whether the modified surface is subsequently bonded to an adhesive or not. When the modified halopolymer is contacted with an adhesive material, whether immediately or three years later, a permanent, non-degrading bond is formed between the oxygen or oxygen functionality groups and the adhesive material.

This is contrary to other methods which etch the surface and merely destroy the fluorinated surface functionality which may initially increase surface reactivity, due to free radical sites, but only for a limited time. As a result of etching the surface the modified surface is not permanent due to reorientation of the surface polymer chains in an attempt to lower surface energy to a more favorable energy state. Moreover, the etched surface is highly vulnerable to degradation under various environmental conditions, such as temperature extremes, humidity and ultraviolet radiation.

The adhesive-oxyhalopolymer composites may be prepared in varying thickness and may be transparent, colored or opaque, have various densities, UV absorbing properties, electromagnetic shielding characteristics and can be doped with flame retardants, smoke retardants, anti-static compounds or any other useful bulk modifiers. Additionally, the adhesive-oxyhalopolymer composites can have varying mechanical strengths which are dependent upon the starting halopolymer and specific properties of the adhesives.

The following examples demonstrate preferred embodiments of the invention, however, it is to be understood that these examples are for illustrative purpose only, and do not purport to be wholly definitive as to conditions and scope.

EXAMPLE 1

Peel Strength Test

To demonstrate the bond strength of the adhesive-oxyhalopolymer composites of this invention and specifically the bond between the oxyhalopolymer material and the adhesive material, peel strength testing was conducted on several samples of commercially available fluoropolymer films. All test composite films were between 4 and 24 mils thick. The fluoropolymers were first modified by a plasma chemistry treatment process (not plasma etching) in which the fluoropolymer films were exposed to a series of glow discharges according to the methods of J. Gardella and T. G. Vargo in U.S. Pat. Nos. 4,946,903 and 5,627,079 the disclosures of which are incorporated herein by reference.

Briefly, the oxyfluoropolymers were prepared by using radio frequency glow discharge (RFGD) in a plasma chamber at pressure vacuums under 1,000 mTorr and having a maximum output of 1000 watts. The starting fluoropolymer film was placed in the plasma reaction chamber and exposed for about 1 to about 20 minutes at about 1000 watts to a gas/vapor RFGD plasma mixture consisting of about 40 to about 80 percent by volume of hydrogen and about 20 to about 60 percent methanol at about 130 mTorr pressure. The plasma treated film had up to 98 percent, and more specifically, from about 20 to about 85 percent of the surface halogen atoms of the oxyhalopolymer material permanently substituted with hydrogen and oxygen and/or oxygen-containing groups of which from about 3 to about 30 percent of the substituted halogen atoms were replaced with oxygen or oxygen-containing groups and from about 70 to about 97 percent of the substituted halogens were replaced with hydrogen atoms. The exact amount of hydrogen, halogen and oxygen or oxygen containing functional groups depends on several variables, such as the type of polymer, the thickness of same and resident time of exposure to the plasma gas/vapor mixtures used in the present invention. It has been discovered that there is an optimal time of exposure to the plasma gas/vapor mixtures for each type of polymer to provide the optimal level of controlled modification and without damaging or etching the surface of the polymer. The halogens were replaced to depths from about 10 to about 100 Å. However, the morphological properties and bulk properties of the oxyhalogenated surface remained substantially unchanged over the starting bulk halopolymer material.

The modified oxyfluoropolymer films were stored for at least three months under ambient conditions and then laminated with pressure sensitive film adhesives (PSA). After the lamination process the adhesive-oxyhalopolymer composites were stored for an additional three months under ambient conditions.

The oxyfluoropolymer films were laminated with acrylic and silicone based PSA. These two types of adhesive were chosen specifically because of their inherent qualities. It is well known in the art that silicone does not display aggressive adhesion and exhibits lower peel strength values, but does display excellent chemical resistance and withstands higher temperatures. On the other hand, acrylic based adhesives display greater adhesion and this is exhibited by higher peel strength values. The acrylic has excellent chemical resistance but displays decreased temperature resistance.

The films were mounted on standard 32 mil, 4"×6" matted carbon steel test plaques (Q-Panel R-46). The films were cut to size as specified in ASTM D 903-93 (Adhesive Pull), applied at room temperature with vigorous thumb pressure and allowed to adhere overnight prior to testing.

The average values for ten samples of each film pulled at 0° C., 23° C. and 60° C. are presented below.

TABLE I

| Plasma Film | Mil | Adhesive | Mil | Total Mil | Peel Strength (oz./in.) 0° C. | 23° C. | 60° C. |
|---|---|---|---|---|---|---|---|
| PTFE (skived#) | 2 | Acrylic | 4 | 6 | 26.2 | 163.2* | 21.6* |
| MFA | 2 | Silicone | 2 | 4 | 50.0 | 33.1 | 23.2 |
| MFA | 2 | Acrylic | 4 | 6 | 86.0 | 140.3* | 29.8* |
| MFA | 10 | Acrylic | 4 | 14 | 133.3 | 157.4* | 56.0 |
| MFA | 20 | Acrylic | 4 | 24 | 168.3 | 136.0 | 62.6 |
| ECTFE | 2 | Acrylic | 4 | 6 | 98.9 | 249.6* | 32.2* |
| ECTFE | 10 | Acrylic | 4 | 14 | 184.0 | 256.0 | 69.8 |
| PCTFE | 2 | Acrylic | 4 | 6 | 110.7 | 225.6* | 26.2* |

*film tear, stretch (i.e. sample ripped in half or elongated prior to pulling free-actual value is higher than reported)
skived is a film type prepared by shaving a large cylinder of solidified polymeric material
MFA: is a perfluoroalkoxy-substituted fluoropolymer available from Ausimont USA, Thoroughfare, New Jersey
PTFE is polytetrafluoroethylene
ECTFE is ethylenechlorotrifluoroethylene
PCTFE is polychlorotrifluoroethylene Representing the current state of the art, commercially available peel data for Teflon® films (trademark of DUPONT) was compared to the test results shown above in Table I. The Teflon® film had been modified with an etching process to prepare a modified film that was defluorinated with some surface oxygen functionality groups. It was subsequently laminated with both silicone and acrylic pressure sensitive adhesives. The testing results for Teflon® film are shown in Table II.

TABLE II

| Etched Film+ | Mil | Adhesive | Mil | Total Mil | Peel Strength (oz./in.) 0° C. | 23° C. | 60° C. |
|---|---|---|---|---|---|---|---|
| PTFE (Teflon ®) High Modulus | 1.5 | Silicone | 3 | 4.5 | NA | 30.0 | NA |
| PTFE (Teflon ®) High Modulus | 1.5 | Silicone | 5 | 6.5 | NA | 45.0 | NA |
| PTFE (Teflon ®) High Modulus | 1.5 | Acrylic | 2 | 3.5 | NA | 35.0 | NA |
| PTFE (Teflon ®) High Modulus | 1.5 | Acrylic | 5 | 6.5 | NA | 45.0 | NA |
| PTFE (Teflon ®) Skived | 1.5 | Silicone | 3 | 4.5 | NA | 30.0 | NA |
| PTFE (Teflon ®) Skived | 1.5 | Silicone | 10 | 11.5 | NA | 45.0 | NA |
| PTFE (Teflon ®) Skived | 1.5 | Acrylic | 10 | 11.5 | NA | 55.0 | NA |

+Commercially available information

A comparison between the adhesive-oxyhalopolymer composites of the present invention and the commercially available etched films clearly shows and proves that the adhesive-oxyhalopolymer composites having a chemical bond between the oxyhalopolymer and adhesive material exhibit unexpected increased bond strengths. As stated earlier, it is believed that the chemical plasma treating of the halopolymer's surface, for an optimal period of time, provides for an undamaged and unetched surface which eliminates rearrangement of the functionality groups which are covalently bonded onto the surface of the oxyhalopolymer.

Specifically, when a comparison is made between the adhesive-oxyhalopolymers composites of the present invention (PTFE/acrylic) and the prior art etched film (PTFE/acrylic), it is evident that the peel strength of the etched film is about 45 oz./in. while the present invention has a peel strength of about 163.2 oz./in. which is more than 3 times higher.

| Film | Mil | Adhesive | Mil | Total Mil | Peel Strength oz./in. 0° C. | 23° C. | 60° C. |
|---|---|---|---|---|---|---|---|
| Prior Art PTFE (Teflon ®) High Modulus | 1.5 | Acrylic | 5 | 6.5 | NA | 45.0 | NA |
| Present Invention PTFE (skived) | 2 | Acrylic | 4 | 6 | 26.2 | 163.2* | 21.6* |

*film tear, stretch (i.e. sample ripped in half or elongated prior to pulling free-actual value is higher than reported)

As stated earlier, silicone adhesive displays low tack/adhesion, but high temperature resistance. In contrast, acrylic adhesive is a more tacky and aggressive adhesive with lower temperature resistance. Accordingly, acrylic peel strength values should be higher than silicone peel strength values if the separation is occurring at the test plaque/adhesive interface. However, if the peel strength values are approximately the same then the failure of a bond is more likely occurring at the film/adhesive interface bond. When examining the spread in the etched films of the same polymer and thickness, whether laminated with silicone or acrylic, it is apparent that there is very little difference in the peel strength values.

| Etched Film+ | Mil | Adhesive | Mil | Total Mil | Peel Strength (oz./in.) 0° C. | 23° C. | 60° C. |
|---|---|---|---|---|---|---|---|
| PTFE (Teflon ®) High Modulus | 1.5 | Silicone | 5 | 6.5 | NA | 45.0 | NA |
| PTFE (Teflon ®) High Modulus | 1.5 | Acrylic | 5 | 6.5 | NA | 45.0 | NA |

The low value of 45.0 oz./in. for the silicon adhesive may be merely separation of the adhesive/test plaque bond, but the acrylic adhesive should show a much higher peel strength value because it is a much more aggressive adhesive. The results above demonstrate that the etched products did not allow the specific adhesive to maximize its expected performance. Instead, the results indicate that in at least the acrylic adhesive test, the etched film/adhesive bond gave way before the testing plaque/adhesive bond.

In contrast, the adhesive-oxyhalopolymer composites allowed the adhesive materials to perform to expected adhesion specifications and it was found that when there was bond breakage, it was between the adhesive and test plaque and not between the oxyhalopolymer and adhesive. In Table I (data from the composites of the present invention) it is shown that MFA/acrylic has a much higher peel value than MFA/silicone, namely, 140.3 oz./in. vs. 33.1 oz./in. This is evidence that failure of the bond between the adhesive and testing plaque was the determining factor in the peel strength values and the resulting data was dependent upon the aggressiveness of the individual adhesives.

The testing results also show that even though the modified films were stored for approximately six months before testing there was no loss of surface reactivity and the functionality sites on the surface had not rearranged during the period of storage.

EXAMPLE 2

Temperature Shock/Cycling

A roll of MFA film (10 mil, 12'×100') that had been previously modified and laminated for testing in Example 1 was used in this testing regime. The roll of MFA had been laminated with a silicone based pressure sensitive adhesive. MFA has an advertised continuous operating temperature of about 246° C., and the silicone adhesive has an advertised continuous operating temperature of about 260° C. Three sample were cut from this roll with each sample being about 1"×2". These samples together with three 32 mil matted carbon steel test plaques, were exposed to the following temperatures for 12 hours to insure optimal adhesion of the adhesive to the test panel:

| Adhesive-Oxyfluoropolymer Composites | Temperature (degrees C.) |
|---|---|
| Sample A | 10 |
| Sample B | 21.1 |
| Sample C | 21.1 |

One 2 mil piece (1"×2") of commercially available etched PTFE (skived) was laminated with 3 mils of silicone pressure sensitive adhesive. PTFE has an advertised continuous operating temperature of 260–274° C. and the silicone adhesive has an advertised operating temperature of about 260° C. The sample together with a 32 mil matted carbon steel test plaque were exposed to the following temperature for 12 hours to insure optimal adhesion of the adhesive to the test panel:

| Etched Film Composites | Temperature (degrees C.) |
|---|---|
| Sample D | 21.1 |

After 12 hours all the adhesive/film samples were applied with vigorous thumb pressure to their respective test plaques and immediately cycled under the following conditions:

| Temperature (° C.) | Dwell Time (minutes) |
|---|---|
| 246 | 15 |
| −19 | 15 |

The samples were cycled eight times wherein each cycle involved 15 min. at 246° and 15 min. at −19°. Samples were placed in the center of both an oven and freezer to allow for rapid heating and cooling of all surfaces. There was no pause between moving the samples from the different temperature extremes, except for the time required for physical movement. After completing eight full cycles the samples were allowed to equilibrate to room temperature. The following results were found when the samples were inspected:

The samples of the present invention, that being samples A, B, and C all remained bonded to the test plaques with no edge curl of the film. Adhesion was excellent, i.e., the same as when first applied and qualitatively determined by hand.

Etched sample D displayed significant edge and corner curl of the film at the conclusion of the second complete cycle with about 25% of the film peeling away from the adhesive. The sample was removed from cycling at this point to inspect adhesion. Approximately 75% of the remaining film was still adhered to the test plaque. The sample was not returned to cycling.

This temperature stress testing regime demonstrated that the adhesive-oxyfluoropolymer composites of the present invention showed no loss of adhesion even under extreme temperature stress and could theoretically be cycled indefinitely. The commercially available etched film did not perform well under thermal stress as evidenced by significant corner peel after only a few stress cycles. Since the PTFE, MFA and silicone adhesive are all rated to operate under these temperatures, the reasoning for the peel curl in the etched film sample must be due to the bond release between the etched film and the adhesive and not bond release between the adhesive material and test plaque. It was noted in the failed etched film sample that the adhesive material was still adhering to the test plaque and that the etched film had separated from the adhesive material. In contrast, the adhesive-oxyhalopolymer composite samples of the present invention maintained a strong chemical bond between the oxyhalopolymer and adhesive in addition to the bond between the adhesive and test plaque.

EXAMPLE 3

Ultraviolet Exposure

The object of this test was to determine the durability of the bond between the adhesive and the oxyhalopolymer after exposure to extreme UV radiation, temperature and humidity conditions. It is well known in the art that these extreme conditions rapidly degrade the adhesive/film bond in both etched and corona treated fluoropolymer films.

Several samples of differing sizes were cut from rolls of plasma treated fluoropolymer films that had been treated and laminated for testing in Example 1. The samples had been modified on both sides of the film to introduce two-sided reactivity and/or bondability. The films were then laminated on one side with either 4 mil of acrylic pressure sensitive adhesive or 2 mil of silicone pressure sensitive adhesive.

The samples were mounted with vigorous thumb pressure in overlapping layers onto 32 mil matted carbon steel test plaques, i.e., wrapped, layered onto the steel and additionally onto itself (adhesive side to non-adhesive side). Samples tested and configuration of wrapping are shown below in Table III.

TABLE III

| Plasma Film | Mil | Adhesive | Mil | Total Mil | Configuration |
| --- | --- | --- | --- | --- | --- |
| MFA | 2 | Acrylic | 4 | 6 | Overlapping strips |
| MFA | 2 | Silicone | 2 | 4 | Overlapping strips |

TABLE III-continued

| Plasma Film | Mil | Adhesive | Mil | Total Mil | Configuration |
| --- | --- | --- | --- | --- | --- |
| MFA | 10 | Acrylic | 4 | 14 | Overlapping strips |
| MFA | 20 | Acrylic | 4 | 24 | Overlapping strips |
| ECTFE | 2 | Acrylic | 4 | 6 | Overlapping strips |
| ECTFE | 10 | Acrylic | 4 | 14 | Overlapping strips |
| ECTFE | 2 | Acrylic | 4 | 6 | Panel wrapped |
| MFA | 2 | Silicone | 2 | 4 | Panel wrapped |
| PCTFE | 2 | Acrylic | 4 | 6 | Overlapping strips |

The test plaques with the adhering films were exposed to the following conditions per ASTM G53-96: Duration 169 hours, UVB—313 Lamp @0.63 W/M$^2$, alternate cycles of 4 hours UV at 60° C. with 4 hours condensation at 50° C.

Inspection of the test plaques showed some expected discoloration of the adhesives, but the chemical bond between the oxyfluoropolymer and the adhesive was not compromised nor was adhesion to the test plaque. Moreover, there was no evidence of edge/corner peeling even in areas of overlapping. In fact, random samples where chosen and the film was forcefully peeled back in order to ascertain the condition of the adhesive post-exposure. In all instances, the adhesive remained bonded to the film and pulled cleanly from the test plaque.

EXAMPLE 4

Nitric Acid Immersion

The object of this testing was to determine the durability of the bond between the oxyhalopolymer and adhesive material. Moreover, to determine if the adhesive-oxyhalopolymer composites can protect surfaces from corrosion due to acid attack. Still further to show that the modifying treatment according to the method of Example 1 has no effect on the chemical resistance on either side of the oxyhalopolymer film.

Several samples of differing sizes were cut from rolls of plasma treated fluoropolymer films that had been previously modified, laminated and stored for testing in Example 1. The samples had been modified on both sides of the films to introduce two-sided reactivity and laminated on one side with either 4 mil of acrylic pressure sensitive adhesive or 2 mil of silicone pressure sensitive adhesive.

The samples, for this testing regime, were mounted with vigorous thumb pressure in overlapping layers onto 32 mil matted carbon steel test plaques, i.e., wrapped or layered onto the steel and additionally onto itself (adhesive side to non-adhesive side). Types of film samples and configuration of film placement are outlined below in Table IV.

TABLE IV

| Plasma Film | Mil | Adhesive | Mil | Total Mil | Configuration |
| --- | --- | --- | --- | --- | --- |
| MFA | 2 | Acrylic | 4 | 6 | Overlapping strips |
| MFA | 2 | Silicone | 2 | 4 | Overlapping strips |
| MFA | 10 | Acrylic | 4 | 14 | 3 layers in pyramid |
| MFA | 20 | Acrylic | 4 | 24 | 3 layers in pyramid |
| ECTFE | 2 | Acrylic | 4 | 6 | 3 layers in pyramid |
| ECTFE | 10 | Acrylic | 4 | 14 | 3 layers in pyramid |
| ECTFE | 2 | Acrylic | 4 | 6 | Panel wrapped |
| MFA | 2 | Silicone | 2 | 4 | Panel wrapped |
| MFA | 10 | Acrylic | 4 | 14 | Panel wrapped |
| PCTFE | 2 | Acrylic | 4 | 6 | Overlapping strips |

The test plaques with the adhering film were completely immersed in 2N (10%) Nitric Acid/water solution at 23° C. having a pH of less than 1.0.

The results demonstrate that adhesion to the test plaque was not affected by this harsh acidic environment because none of the samples displayed any edge/corner peel back.

The double-sided plasma treatment had no deleterious impact on the film's ability to resist chemical attack. This further supports the claim that the modification method has no noticeable impact on the bulk or surface properties of the starting fluoropolymer, aside from introducing the ability to chemically bond to an adhesive which is the subject of this invention.

The samples had to be removed from the nitric acid after 5 hours because the carbon steel test plaques, in all the uncoated areas, including the side of the plaque that was not covered, were almost completely dissolved and/or corroded by the acid. All regions under the adhesive-oxyfluoropolymer composites were completely protected from attack and revealed virgin, shiny and uncorroded steel. Only one sample showed any attack at the edges, and this was reserved to an isolated region at one edge which did not undercut the film much more than $\frac{1}{16}$".

It was observed that the test plaques wrapped in thick 10 and 20 mil film did have a few channels that were exposed to the acid because it was difficult to wrap the film around the test plaques due to the modulus of the film. The channel regions of these test plaques that were exposed to the acid did show some corrosion of the steel, but there was no corrosion adjacent to the channels where the film was firmly bonded to the steel. In no sample did the film peel back. Furthermore, the bonds, both adhesive/test plaque and oxyfluoropolymer/adhesive, survived in an environment which quickly corroded the steel. All the wrapped or layered test plaques showed no curling of edges or release of adhesion in areas where the adhesive-oxyhalopolymer composite bonded to itself which is further indication of the unexpected superior and permanent bond strength.

EXAMPLE 5

Additional testing was conducted to demonstrate the bond strength between an oxyhalopolymer and adhesive material. Several film samples of different halopolymers of 2 mil thickness, including MFA, ECTFE and PCTFE were chemically plasma treated according to Example 1.

The oxyfluoropolymer films were laminated with a rubber pressure sensitive film adhesive (PSA). The rubber PSA material A (8 mil) and B (6 mil) were laminated to the oxyfluoropolymer films at room temperature using appropriate pressure to secure the adhesive to the film. The samples were laid onto and adhered to either a smooth polypropylene or polished stainless steel test plaque. The test strips of the adhesive-oxyhalopolymer composites were subjected to a pull rate of 12"/min with load ranging from about 1 to about 15 psi according to Pressure Sensitive Tape Council (PSTC) conditions. Surprisingly, it was found that the chemical bond between the PSA adhesive material and oxyfluoropolymeric film showed extraordinary strength even at temperatures as high as 82.2° C. which is the upper optimum operating temperature for these rubber adhesives. The data in Table V and Table VI show the numerical test results substantiating the surprisingly and unexpected bond strengths between the PSA adhesive material and oxygen or oxygen functionality groups on the surface of the oxyfluoropolymeric films treated according to the methods of the present invention. More important, any failure that did develop routinely occurred by a weakened bond between the PSA and the test plaques of smooth polypropylene (PP) and polished stainless steel (SS) and not between the PSA and oxyfluoropolymer film verifying the strength of the bond between the oxyfluoropolymer film and adhesive. The results show consistent and superior bonding strength indicating a strong and permanent chemical bond between the oxygen or oxygen-containing functionality sites of the chosen halopolymer films and adhesive material.

TABLE V

SUBSTRATE - SMOOTH POLYPROPYLENE

| MODIFIED FILM TYPE | ADHESIVE | TEST TEMP (C.°) | RESULTS (oz/in) |
|---|---|---|---|
| MFA# | A | 21.1 | 129.6 FT** |
|  |  | 82.2 | 68.8 AFP |
|  | B | 21.1 | 134.4 FT |
|  |  | 82.2 | 54.4 AFP |
| PTFE | A | 21.1 | 49.6 AFP |
|  |  | 82.2 | 46.4 AFP |
|  | B | 21.1 | 46.4 AFF |
|  |  | 82.2 | 32.0 AFP |
| ECTFE | A | 21.1 | 57.6 AFP |
|  |  | 82.2 | 65.5 AFP |
|  | B | 21.1 | 100.8 CF |
|  |  | 82.2 | 54.4 AFP |

TABLE VI

SUBSTRATE - POLISHED 304 STAINLESS STEEL

| MODIFIED FILM TYPE | ADHESIVE | TEST TEMP (C.°) | RESULTS (oz/in) |
|---|---|---|---|
| MFA | A | 21.1 | 152.0 FT |
|  |  | 82.2 | 67.2 AFP |
|  | B | 21.1 | 128.0 FT |
|  |  | 82.2 | 59.2 AFP |
| PTFE | A | 21.1 | 152.0 FT/AFP |
|  |  | 82.2 | 57.6 AFP |
|  | B | 21.1 | 123.2 FT |
|  |  | 82.2 | 38.4 AFP |
| ECTFE | A | 21.1 | 163.2 AFP |
|  |  | 82.2 | 68.8 AFP |
|  | B | 21.1 | 196.8 AFP |
|  |  | 82.2 | 41.6 AFP |

**AFF: Adhesive Failure Film - The adhesive adhered to the polypropylene and stainless steel and the film was stripped away cleanly.
AFP: Adhesive Failure Plaque - The adhesive stayed attached to the film and this laminate was removed cleanly from the test plaque of PP or SS.
FT: Film Tear - Here there was no peel at all. The film broke in tensile immediately before any peel could occur.
CF: Cohesive Failure - Here the adhesive was torn apart with basically equal amounts on the film and on the test plaque.
MFA: is a perfluoroalkoxy-substituted fluoropolymer available from Ausimont USA, Thoroughfare, New Jersey

What is claimed is:

1. An adhesive-oxyhalopolymer composite comprising:

(a) an oxyhalopolymer prepared from a halopolymer in which from 1 to 100 percent of surface halogens are permanently substituted with hydrogen and oxygen or oxygen-containing groups of which from about 3 to about 30 percent of the substituted halogens are replaced with oxygen or oxygen-containing groups and from about 70 to about 97 percent of the substituted halogens are replaced with hydrogen atoms; and (b) an adhesive material engaged with said oxyhalopolymer and chemically bonded to the oxygen or oxygen-containing groups of the oxyhalopolymer.

2. The adhesive-oxyhalopolymer composite according to claim 1 wherein the surface halogen is at least one member selected from the group consisting of fluorine, chlorine, bromine and iodine.

3. The adhesive-oxyhalopolymer composite according to claim 1 wherein the oxyhalopolymer is selected from a group consisting of an oxyfluoropolymer and oxychlorofluoropolymer.

4. The adhesive-oxyhalopolymer composite according to claim 1 wherein the adhesive material is a member selected from the group consisting of epoxy, aqueous based adhesive, solvent based adhesive, acrylic adhesive, fluorine based adhesives, polyester adhesive, heat sealable, pressure sensitive rubber adhesive, pressure sensitive acrylic adhesive, pressure sensitive silicone adhesive and release coating adhesive.

5. The adhesive-oxyhalopolymer composite according to claim 3 wherein the adhesive material is a member selected from the group consisting of epoxy, aqueous based adhesive, fluorine based adhesive, solvent based adhesive, acrylic adhesive, polyester adhesive, heat sealable adhesive, pressure sensitive rubber adhesive, pressure sensitive acrylic adhesive, pressure sensitive silicone adhesive and release coating adhesive.

6. The adhesive-oxyhalopolymer composite according to claim 1 wherein from about 20 to about 85 of the surface halogen atoms are substituted with hydrogen and oxygen or oxygen-containing groups.

7. The adhesive-oxyhalopolymer composite according to claim 1 wherein the halopolymer is a member selected from the group consisting of FEP, PTFE, ePTFE, MFA, PFA, ECTFE, PCTFE and PVDF.

8. The adhesive-oxyhalopolymer composite according to claim 1 wherein the composite is bonded onto a substrate selected from the group consisting of metals, non-metals, plastics and ceramics.

9. The adhesive-oxyhalopolymer composite according to claim 1 wherein the composite is bonded to a carbon steel substrate.

10. The adhesive-oxyhalopolymer composite according to claim 1 wherein:
(a) the halopolymer is a film having first and second sides wherein each side has a surface and with the surface of at least the first side having up to 98 percent of surface halogens permanently substituted with hydrogen and oxygen or oxygen-containing groups of which from about 3 to about 30 percent of the substituted halogens are replaced with oxygen or oxygen-containing groups and from about 70 to about 97 percent of the substituted halogens are replaced with hydrogen atoms to form an oxyhalopolymer on at least the first side; and
(b) the adhesive material engaged with said oxyhalopolymer and chemically bonded to the oxygen or oxygen-containing groups on at least the first side of the oxyhalopolymer.

11. The adhesive-oxyhalopolymer composite according to claim 1 wherein the chemical bond between the oxyhalopolymer and adhesive is characterized by resistance to chemical attack, ultraviolet radiation, temperature extremes and humidity.

12. The adhesive-oxyhalopolymer composite according to claim 10 wherein the second side of the halopolymer has up to 98 percent of said surface halogens permanently substituted with hydrogen and oxygen or oxygen-containing groups of which from about 3 to about 30 percent of the substituted halogens are replaced with oxygen or oxygen-containing groups and from about 70 to about 97 percent of the substituted halogens are replaced with hydrogen atoms wherein the oxygen or oxygen-containing groups are covalently bonded to a transition metal or a conductive metallic film.

13. The adhesive-oxyhalopolymer composite according to claim 12 wherein the transition metal is bonded to an adhesive.

14. The adhesive-oxyhalopolymer composite according to claim 1 wherein the oxygen containing group is a hydroxyl group.

15. An adhesive-oxyhalopolymer composite, which comprises a halogenated polymer having an outer surface modified with hydrogen and oxygen or oxygen containing groups substituted for at least a portion of the halogen atoms thereon to provide an oxyhalopolymer; and an adhesive material engaged with said oxyhalopolymer and chemically bonded to the oxygen or oxygen containing groups of the oxyhalopolymer.

16. A method of making a permanently bonded adhesive-oxyhalopolymer composite, comprising a halogenated polymer having an outer surface modified with hydrogen and oxygen or oxygen containing groups substituted for at least a portion of the halogen atoms thereon to provide an oxyhalopolymer and an adhesive material engaged with said oxyhalopolymer and chemically bonded to the oxygen or oxygen containing groups of the oxyhalopolymer which method comprises the steps of:
(a) providing a halopolymer;
(b) modifying the halopolymer wherein from 1 to 100% percent of surface halogens are permanently substituted with hydrogen and oxygen or oxygen-containing groups to a depth of from about 10 to 100 Å thereby forming an oxyhalopolymer; and
(c) contacting the oxyhalopolymer with an adhesive material to facilitate the forming of a chemical bond between the oxygen or oxygen-containing sites of the oxyhalopolymer and the adhesive material.

17. The method of making a permanently bonded adhesive-oxyhalopolymer composite according to claim 16 wherein from about 3 to about 30 percent of the substituted halogens are replaced with oxygen or oxygen-containing groups and from about 70 to about 97 percent of the substituted halogens are replaced with hydrogen atoms.

18. The method of making a permanently bonded adhesive-oxyhalopolymer composite according to claim 16 wherein the oxyhalopolymer is selected from a group consisting of an oxyfluoropolymer and oxychlorofluoropolymer.

19. The method of making a permanently bonded adhesive-oxyhalopolymer composite according to claim 16 wherein the adhesive material is a member selected from the group consisting of epoxy, aqueous based adhesive, solvent based adhesive, acrylic adhesive, polyester adhesive, fluorine based adhesive, heat sealable adhesive, pressure sensitive rubber adhesive, pressure sensitive acrylic adhesive, pressure sensitive silicone adhesive and release coating adhesive.

20. The method of making a permanently bonded adhesive-oxyhalopolymer composite according to claim 16 wherein from about 20 to about 85 percent of the surface halogens are substituted with hydrogen and oxygen or oxygen-containing groups.

21. The method of making a permanently bonded adhesive-oxyhalopolymer composite according to claim 16 wherein the halopolymer is a member selected from the group consisting of FEP, PTFE, ePTFE, MFA, PFA ECTFE, PCTFE and PVDF.

22. The method of making a permanently bonded adhesive-oxyhalopolymer composite according to claim 16 wherein the chemical bond is covalent.

23. An adhesive-oxyhalopolymer composite prepared according to claim 16.

24. A method of making a permanently bonded adhesive-oxyhalopolymer composite using a non-halogenated base substrate, said composite comprising a halogenated polymer having an outer surface modified with hydrogen and oxygen or oxygen containing groups substituted for at least a portion of the halogen atoms thereon to provide an oxyhalopolymer and an adhesive material engaged with said oxyhalopolymer and chemically bonded to the oxygen or oxygen containing groups of the oxyhalopolymer, the method comprising the steps of:

(a) providing the non-halogenated base substrate selected from the group consisting of polymeric, ceramic and metallic materials;

(b) halogenating the surface of the non-halogenated base substrate with molecularly bonded halogen atoms or a halocarbon polymer film to form a halopolymer on the surface of the non-halogenated base substrate;

(c) modifying the halopolymer wherein from 1 to 100% percent of surface halogens are permanently substituted with hydrogen and oxygen or oxygen-containing groups to a depth of from about 10 to 100 Å thereby forming an oxyhalopolymer; and (d) contacting the oxyhalopolymer of step (c) with an adhesive material to facilitate the forming of a chemical bond between the oxygen or oxygen-containing sites of the oxyhalopolymer and the adhesive material.

25. A method of making an adhesive-oxyhalopolymer composite, comprising:

contacting an oxyhalopolymer with an adhesive material to form a composite, wherein at least one surface of said oxyhalopolymer comprises from about 1 to about 100 percent of surface halogens permanently substituted with hydrogen and oxygen or oxygen-containing groups of which from about 3 to about 30 percent of the substituted halogens are replaced with oxygen or oxygen-containing groups and from 70 to about 97 percent of the substituted halogens are replaced with hydrogen atoms, said adhesive material chemically bonded to said oxyhalopolymer.

26. An adhesive-oxyhalopolymer composite made according to the method of claim 25.

\* \* \* \* \*